United States Patent
Woicke

(10) Patent No.: US 8,834,058 B2
(45) Date of Patent: Sep. 16, 2014

(54) INSTALLATION ELEMENT OF AN INSTALLED PACKING

(75) Inventor: Nina Woicke, Münster (DE)

(73) Assignee: GEA 2H Water Technologies GmbH, Wettringen (DE)

(*) Notice: Subject to any disclaimer, the term of this patent is extended or adjusted under 35 U.S.C. 154(b) by 428 days.

(21) Appl. No.: 12/854,325

(22) Filed: Aug. 11, 2010

(65) Prior Publication Data

US 2011/0036542 A1 Feb. 17, 2011

Related U.S. Application Data

(63) Continuation-in-part of application No. PCT/EP2009/000361, filed on Jan. 22, 2009.

(51) Int. Cl.
*F16B 9/00* (2006.01)
*B01J 19/32* (2006.01)
*F28F 25/08* (2006.01)

(52) U.S. Cl.
CPC ........... *F28F 25/08* (2013.01); *F28F 2275/143* (2013.01); *B01J 2219/32483* (2013.01); *F28F 2275/085* (2013.01); *B01J 19/32* (2013.01); *B01J 2219/32251* (2013.01); *B01J 2219/3313* (2013.01)
USPC ........................................... 403/252; 24/662

(58) Field of Classification Search
USPC ......... 403/193, 242, 244, 274, 280, 282, 285, 403/DIG. 14; 261/95, 108, 111, 112.1, 113, 261/DIG. 72; 411/508, 509, 511; 24/674, 24/662, 104, 108
See application file for complete search history.

(56) References Cited

U.S. PATENT DOCUMENTS

| | | | | |
|---|---|---|---|---|
| 2,838,820 A * | 6/1958 | Hakanson | ........................ | 24/662 |
| 2,917,292 A * | 12/1959 | Hittrich | .............................. | 261/7 |
| 2,977,103 A * | 3/1961 | Smith et al. | .................... | 261/111 |
| 3,028,184 A * | 4/1962 | Knowlton | ...................... | 403/282 |
| 3,189,335 A * | 6/1965 | Fuller et al. | ................. | 261/112.1 |
| 3,281,307 A * | 10/1966 | Moeller et al. | ................ | 428/179 |
| 3,466,077 A * | 9/1969 | Moberg | ......................... | 292/322 |
| 3,496,996 A * | 2/1970 | Osdor | ........................... | 165/111 |
| 4,059,300 A * | 11/1977 | Moberg et al. | ................. | 292/322 |
| 4,198,772 A * | 4/1980 | Furutu | ............................ | 40/665 |
| 4,339,399 A * | 7/1982 | Nutter | ......................... | 261/112.1 |
| 4,451,411 A * | 5/1984 | Lefevre | ......................... | 261/111 |
| 4,477,394 A | 10/1984 | Armstrong et al. | | |
| 4,579,184 A * | 4/1986 | Hiramoto | ..................... | 180/68.4 |
| 4,590,731 A * | 5/1986 | DeGooyer | ...................... | 52/581 |
| 4,657,711 A * | 4/1987 | Wigley | ......................... | 261/79.2 |
| 4,728,468 A * | 3/1988 | Duke | ............................. | 261/111 |

(Continued)

FOREIGN PATENT DOCUMENTS

DE 42 41 859 6/1994
DE 197 33 480 2/1999

(Continued)

*Primary Examiner* — Michael P Ferguson
*Assistant Examiner* — Daniel Wiley
(74) *Attorney, Agent, or Firm* — Greer, Burns & Crain Ltd.

(57) ABSTRACT

An installation element of an installed packing for material and/or heat exchange between gases and liquids, having pegs and recesses for engaging with at least one further installation element. In order to make the engagement easier the recesses each are associated with ring gap segments.

17 Claims, 7 Drawing Sheets

(56) References Cited

U.S. PATENT DOCUMENTS

| | | | | |
|---|---|---|---|---|
| 4,740,334 | A * | 4/1988 | Rukovena, Jr. | 261/112.2 |
| 4,742,881 | A | 5/1988 | Kawaguchi et al. | |
| 4,760,752 | A * | 8/1988 | Wield et al. | 74/434 |
| 4,770,234 | A * | 9/1988 | Hiraoka et al. | 165/69 |
| 5,017,309 | A * | 5/1991 | Peterson | 261/111 |
| 5,413,872 | A * | 5/1995 | Faigle | 428/603 |
| 5,474,832 | A * | 12/1995 | Massey | 428/182 |
| 5,747,140 | A * | 5/1998 | Heerklotz | 428/131 |
| 5,842,494 | A * | 12/1998 | Wu | 135/33.41 |
| 6,096,407 | A * | 8/2000 | Vodicka et al. | 428/175 |
| 6,544,628 | B1 * | 4/2003 | Aull et al. | 428/179 |
| 6,640,427 | B2 * | 11/2003 | Aull et al. | 29/796 |
| 6,708,432 | B2 * | 3/2004 | Haar et al. | 40/301 |
| 6,877,205 | B2 * | 4/2005 | Aull et al. | 29/521 |
| 7,618,026 | B2 * | 11/2009 | Armstrong | 261/111 |
| 2003/0071374 | A1 * | 4/2003 | Engh et al. | 261/112.1 |
| 2004/0150122 | A1 * | 8/2004 | Engh et al. | 261/94 |

FOREIGN PATENT DOCUMENTS

| | | |
|---|---|---|
| EP | 1 152 205 | 11/2001 |
| GB | 2 008 735 | 6/1979 |
| JP | 02031927 | 2/1990 |
| JP | 06064453 | 3/1994 |

\* cited by examiner

INSTALLATION ELEMENT OF AN INSTALLED PACKING

RELATED APPLICATIONS

This application is a continuation-in-part of PCT/EP2009/000361 filed Jan. 22, 2009 and designating the United States.

BACKGROUND OF THE INVENTION

The present invention relates to an installation element of an installed packing for the exchange of material and/or heat between gases and liquids, having pegs and recesses for locking with at least one additional identical installation element.

Such installation elements are known from, inter alia, DE 197 33 480 C2, and, in the state in which they are connected to additional identical installation elements, act as what is known as an installed packing that is situated for example in a wet cooling tower in order on the one hand to cause warm water that is to be cooled to flow from above to below through the installed packing, and on the other hand to conduct cooling air through the installed packing in a cross-current and/or counter-current. Here, each installation element is made up of a plate-shaped body that can have a corrugated surface structure in order to enlarge the contact surface between the gas and the liquid. In order to connect a plurality of installation elements to each other, here it is proposed that each of these elements be provided with corresponding pegs and recesses in order to enable adjacent installation elements to be locked to one another. A concrete embodiment of the recesses and pegs is disclosed in FIG. 7, in which mushroom-head-shaped pegs are shown.

In addition, from DE 42 41 859 A1 a plate element for a heat exchanger is known that can be assembled to additional identical plate elements via a locking connection to form a packing element. According to FIG. 3, the pegs are fashioned in the shape of mushroom heads, and according to patent claim 4 the plate element is elastically flexible at least in the area corresponding to the pegs. In this way, the peg can be pushed more easily into the hole and locked there due to the elasticity of the plate element material. This elasticity is always ensured given the preferred thicknesses named in the document of the film material of the plate element, which are only 0.2 mm or 0.4 mm. If, however, a thicker material is selected for the plate element, such an elasticity surrounding a hole can practically no longer be realized.

SUMMARY OF THE INVENTION

Therefore, the present invention is based on the object of creating an installation element of the type named above that can easily be locked with further, perhaps identical plate elements with a low application of force, such that once created, a locking connection is to be long-lasting.

A first solution of this problem is achieved according to the present invention in an installation element of the type named above in that at least one ring gap segment is allocated to each of the recesses.

The present invention creates an installation element that essentially has a shape and design substantially identical to known installation elements having pegs and recesses for locking with further installation elements. Through at least one additional ring gap segment allocated to each recess in the installation element, a significant simplification of the pushing together and locking with one another of the parts is achieved. During the introduction and pushing through of a peg fashioned so as to correspond to the recess, the material of the installation element in the region surrounding the recess is displaced or deflected into the ring gap segment by the penetrating peg. Even given larger material thicknesses, e.g. 1 to 3 mm, an especially large application of force is not required in order to accomplish this. The ring gap segment is usefully, and thus technically simply, formed by a gap in the material of the installation element.

Of course, the size and shape of the ring gap segment are matched to the size and shape of the recess and of the corresponding peg. For example, given an essentially conical or mushroom-head-shaped peg, the ring gap segment will preferably be formed as a circular arc segment in order to ensure a uniform displacement of the material in the edge area of the recess.

Plastics, such as polyethylene or polypropylene, are standardly used as materials for such installation elements, so that during the manufacture of an installation element such additional ring gap segments can easily be fashioned in the area of the recesses. Such plastic materials also have sufficient elasticity to enable, on the one hand, the surrounding material of the installation element to recede into the ring gap segment when the peg is pushed through the recess, and on the other hand to ensure that this material will return to its initial position after this pushing through.

Of course, on one installation element a plurality of such pegs and/or recesses having a ring gap segment may be present, in order for example to connect a large-surface installation element to an additional installation element at a plurality of points.

In particular given larger material thicknesses of the installation element, for example several millimeters, these additional ring gap segments are what make it possible to introduce mushroom-head-shaped pegs into corresponding recesses and to push them through, so that stable, loadable installed packings can easily be obtained.

In a first preferred embodiment, the installation element has at each recess a plurality of ring gap segments that are in particular situated symmetrically. For example, two circular arc segments situated opposite one another can be provided so as to surround the recess. Likewise, three or four ring gap segments can be provided that are situated equidistant from one another.

In order to lock the peg in the recess, at least one locking shoulder is preferably fashioned on the peg. When the peg is introduced into the recess, this locking shoulder displaces the material in the edge area of the recess outward (seen in the radial direction), into the ring gap segment. When the peg is introduced far enough into the recess, a support surface of the locking shoulder comes to rest on a surface situated opposite the side of the introduction of the peg into the installation element. At the same time, the material surrounding the recess can again assume its original shape, because it is no longer displaced by the locking shoulder, which (seen in the radial direction) protrudes past a peg area that is for example formed as a shaft.

Preferably, a plurality of such locking shoulders or locking projections are fashioned on the peg, and are in particular situated symmetrically to one another. For example, two locking shoulders situated opposite one another can be fashioned on the peg. Three or four locking shoulders may also be provided. It is also possible to form a collar that runs continuously around the circumference of the peg, i.e. to fashion the peg in the shape of a mushroom head.

According to a particularly preferred specific embodiment, the locking projections on the peg correspond to the ring gap segments in the installation element. This means that, seen in the circumferential direction of the peg, the locking shoulder or shoulders are situated so as to surround the recess in the area of the ring gap segments, so that when the peg is pushed through, the protruding locking shoulders can displace the material of the installation element into the ring gap segments.

In order to increase the stability of an installed packing assembled from a plurality of installation elements locked to one another, and in order to improve the holding together of installation elements, one or more additional openings or holes can be made in the installation elements that align with one another in the assembled state. A rod-shaped or tube-shaped stay made of plastic or metal can be guided through these openings, and the outer layers of the installed packing can be held together or pressed together by means of known holding means on the stay.

According to a second solution of the object described above, alternatively or additionally the peg can be hollow or slotted over at least a part of its length, so that the peg is flexible in its diameter at least in some sections. This can be easily realized during the manufacture of such an installation element. If the peg constructed in this way is inserted through a corresponding recess, locking shoulders that are fashioned on the outer circumference of the peg are pushed inward (seen in the radial direction) by the edge area of the recess. After the peg, or its locking shoulders, have passed through the recess of the other installation element, the peg can return to its original shape. Of course, it is also possible to provide a plurality of material recesses and/or a plurality of locking shoulders fashioned in the manner described above on such a peg. The recess in the other installation element can be a simple opening not having associated ring gap segments.

In principle, it is also possible both for one or more ring gap segments to be fashioned on such installation elements, surrounding the recesses, and for the peg to be hollow or slotted over at least a part of its length.

In another embodiment, it is preferably provided that in the peg there is fashioned a hollow duct or slot-type material recess that goes out from one end of the peg and runs longitudinally through the peg over a part of its length. Such a material recess is easy to manufacture and provides the desired yielding property of the peg in its radial direction.

In particular for the purpose of economical manufacturability and good longevity, the installation element is preferably a grid mat or corrugated sheet manufactured in one piece from plastic as an injection-molded part.

BRIEF DESCRIPTION OF THE DRAWINGS

In the following, two exemplary embodiments of the present invention are explained in more detail on the basis of a drawing.

DETAILED DESCRIPTION OF THE PREFERRED EMBODIMENTS

Figure 4:
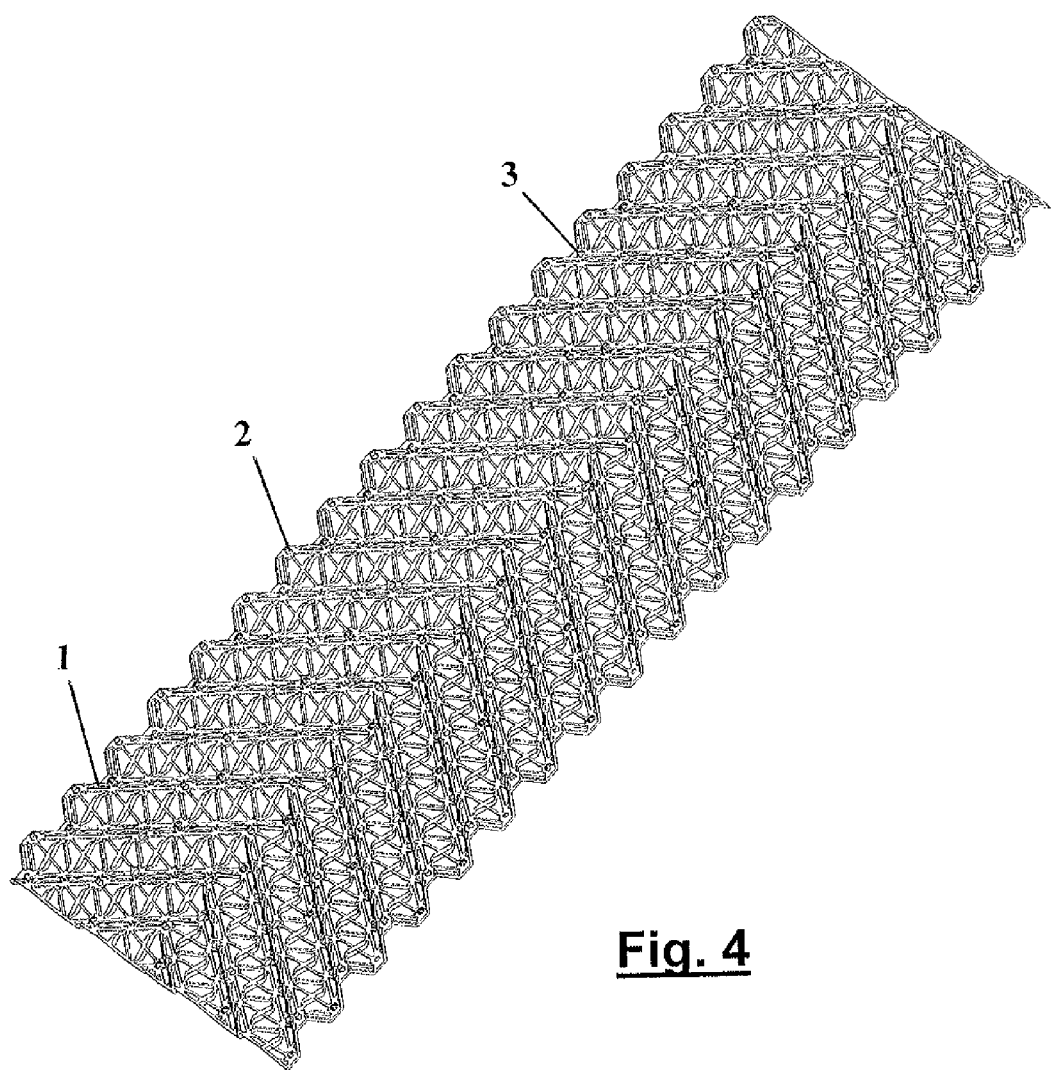
FIG. 4 shows an entire installation element in a perspective view.
Figure 5:
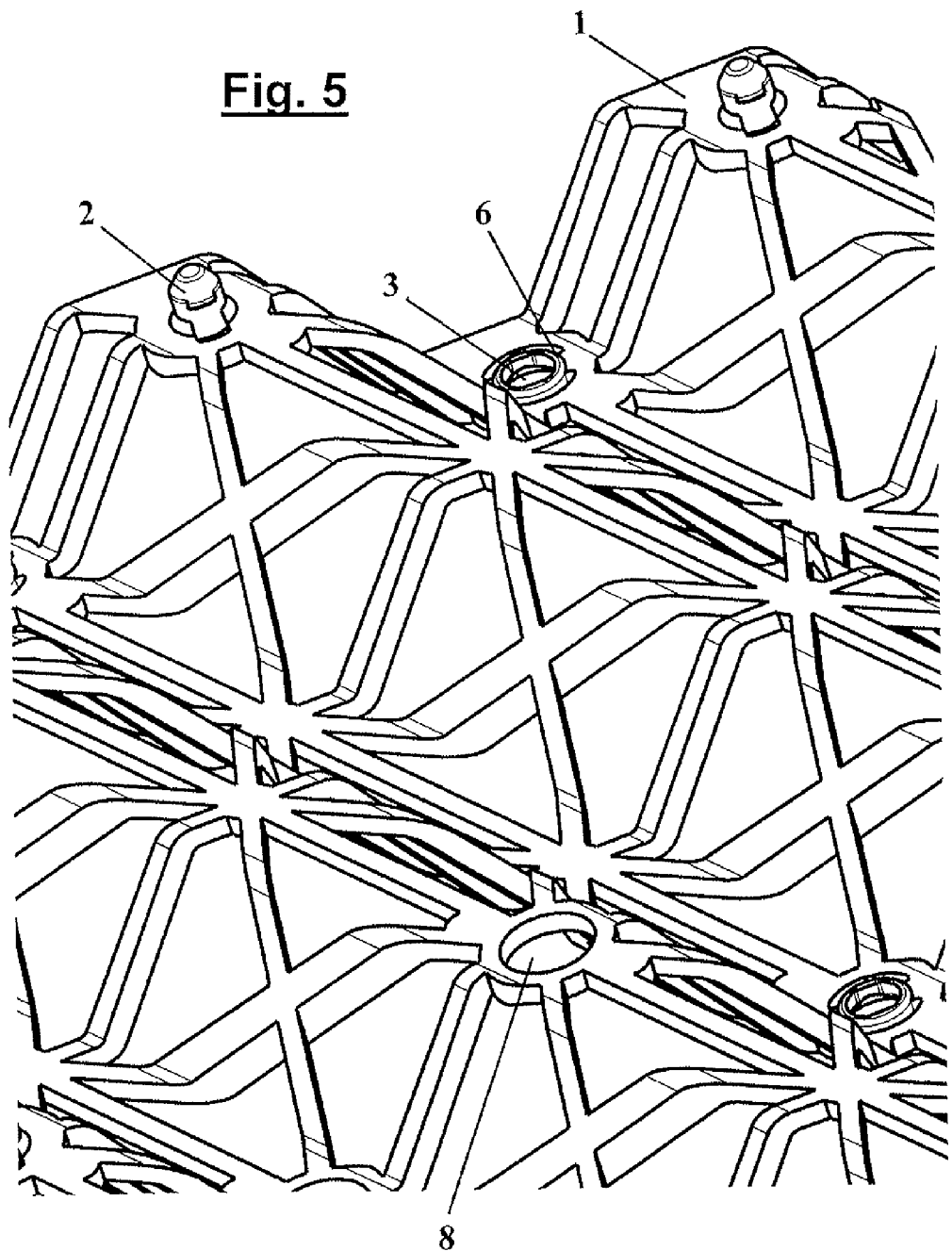
FIG. 5 shows an enlargement of a portion of the installation element of FIG. 4.

Installation elements 1 (FIGS. 4 and 5), which are preferably made of a plastic suitable for this purpose, are locked to one another by pegs 2 and corresponding recesses 3, in order for example to form an installed packing for a cooling tower. Such installation elements 1, for example in the form of a grid mat, are known from the prior art cited above. Pegs 2 can either be fashioned in one piece with installation element 1 during the manufacture thereof (such as by simultaneous molding) or can subsequently be glued or welded with a foot element onto the installation element. The recesses similarly may be formed integrally and simultaneously with the installation element 1 during the manufacturing process, or may be formed in separate pieces that are glued or welded onto the installation element.

Figure 1:
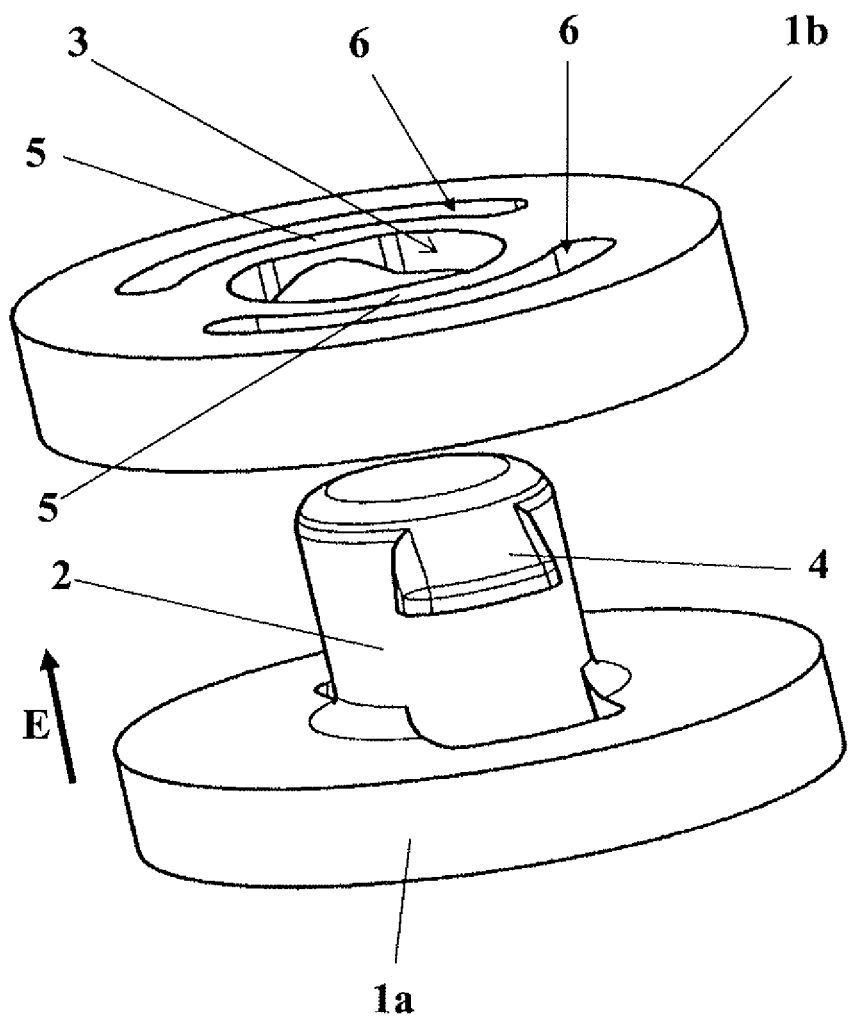
FIG. 1 shows a segment of an installation element having a peg before introduction into an associated recess of another installation element, in a perspective view.

FIG. 1 of the drawing shows, in a perspective view, a peg 2 of an installation element 1a (shown only partially) that is introduced, in a direction of introduction indicated by arrow E, into a corresponding recess 3 of another identically constructed installation element 1b (also shown only partially). The installation elements 1a and 1 may be constructed identically to one another, or they may be different in their construction and configuration.

On peg 2 there are fashioned two locking shoulders 4 that are situated opposite one another. When peg 2 is pushed through recess 3, locking shoulders 4 displace the material in edge area 5 of recess 3 into ring gap segments 6, which are situated opposite one another and are shaped as circular arcs. The material of installation element 1 has flexibility sufficient for this purpose.

In principle, the component designated installation element 1a here can also be a foot element that is for example welded onto an installation element 1.

Figure 2:
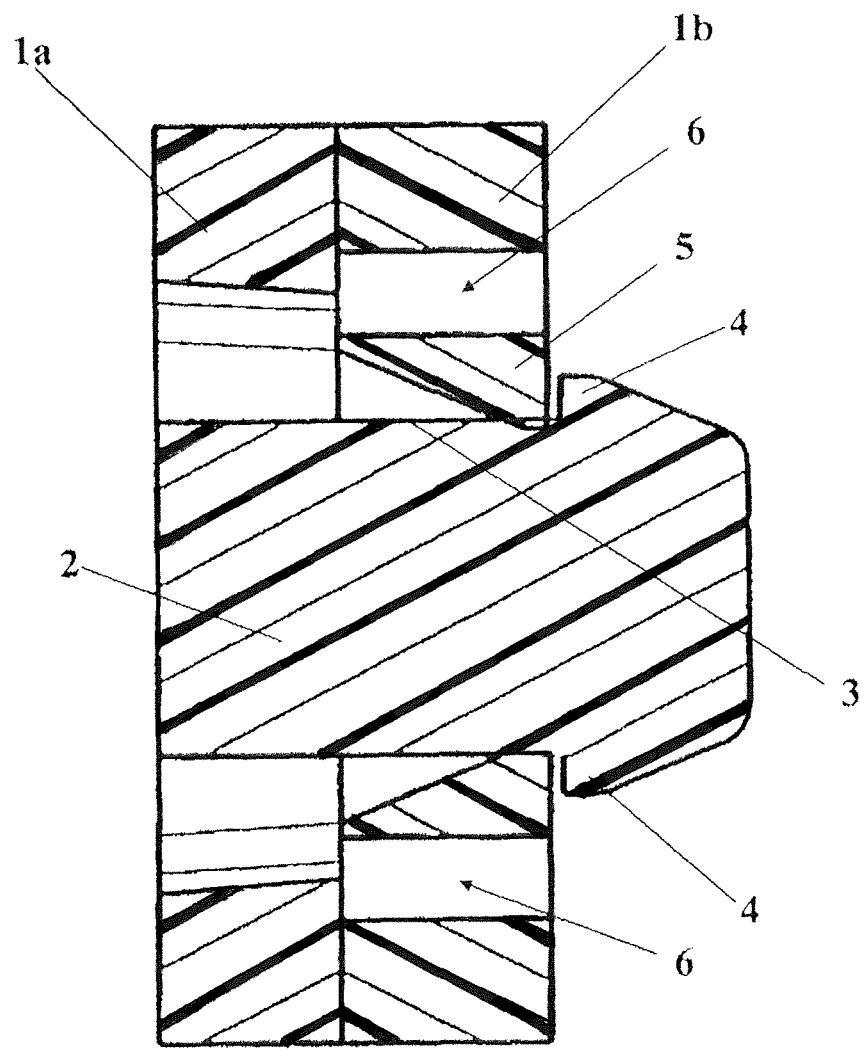
FIG. 2 shows a peg locked in the recess in section.

FIG. 2 shows peg 2 of first installation element 1a, completely pushed through recess 3. In installation element 1b, the material in edge area 5 surrounding recess 3 has returned to its initial position, so that ring gap segments 6 are again present in their original dimension. Due to the larger diameter of locking shoulders 4 relative to recess 3, locking shoulders 4 come to rest on the surface of the material in edge area 5 surrounding recess 3 in installation element 1b. An undesired self-acting withdrawal of peg 2 from recess 3 is practically prevented in this way.

Figure 6:
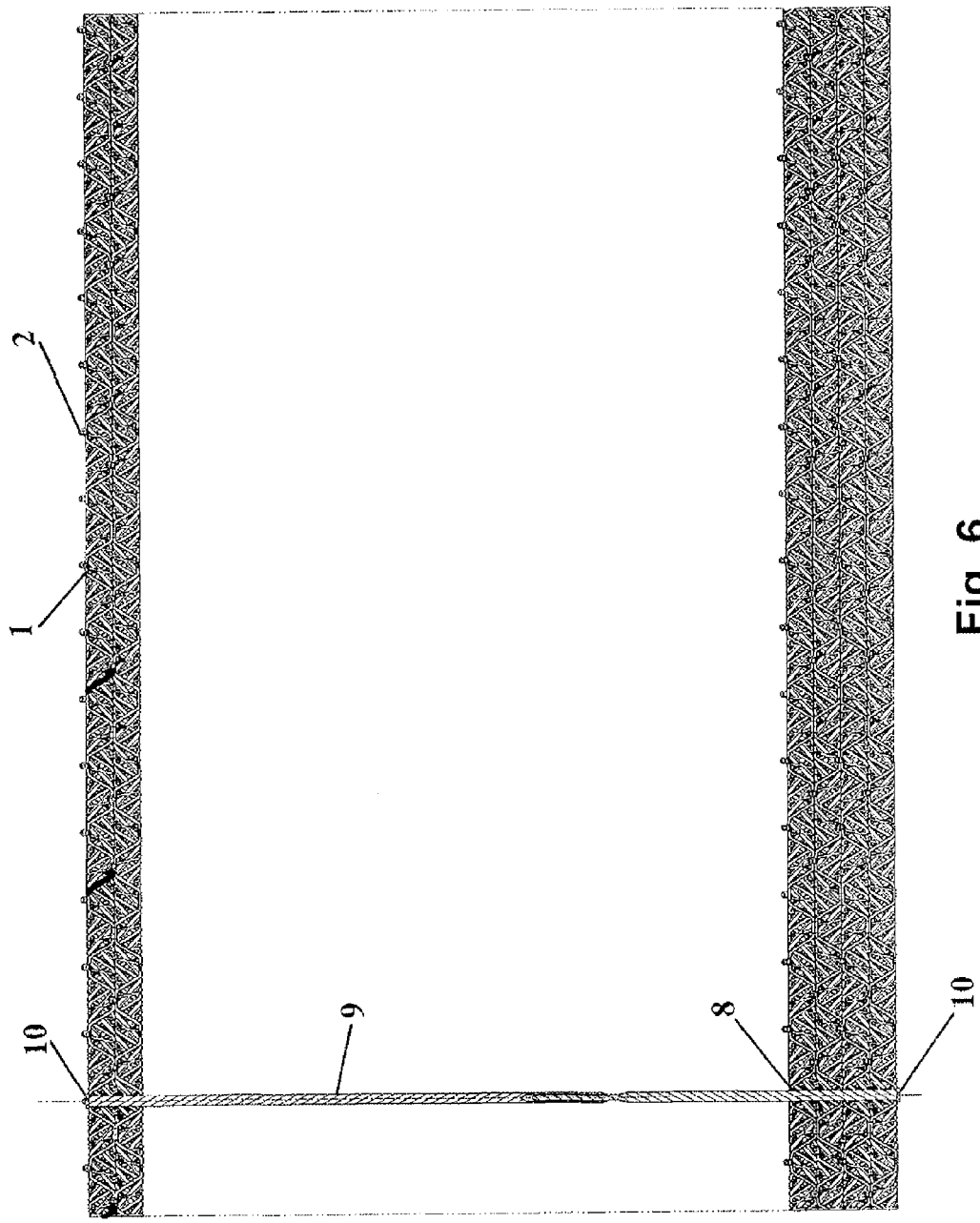
FIG. 6 shows a stack of locked together installation elements in a side sectional view.

In order to increase the stability of an installed packing assembled from a plurality of installation elements 1 locked to one another, and in order to improve the holding together of installation elements, one or more additional openings or holes 14 (FIG. 5) can be made in the installation elements that align with one another in the assembled state. FIG. 6 shows a partial stack of installation elements 1 that are locked together with the pegs 2 and recesses 3. Openings 8 (FIG. 5) are arranged in vertical alignment. A rod-shaped or tube-shaped stay 9 made of plastic or metal can be guided through these openings 8, and the outer layers of the installed packing can be held together or pressed together by means of known holding means 10 such as pins, threaded fasteners or friction fit fasteners, on the stay.

Figure 3:
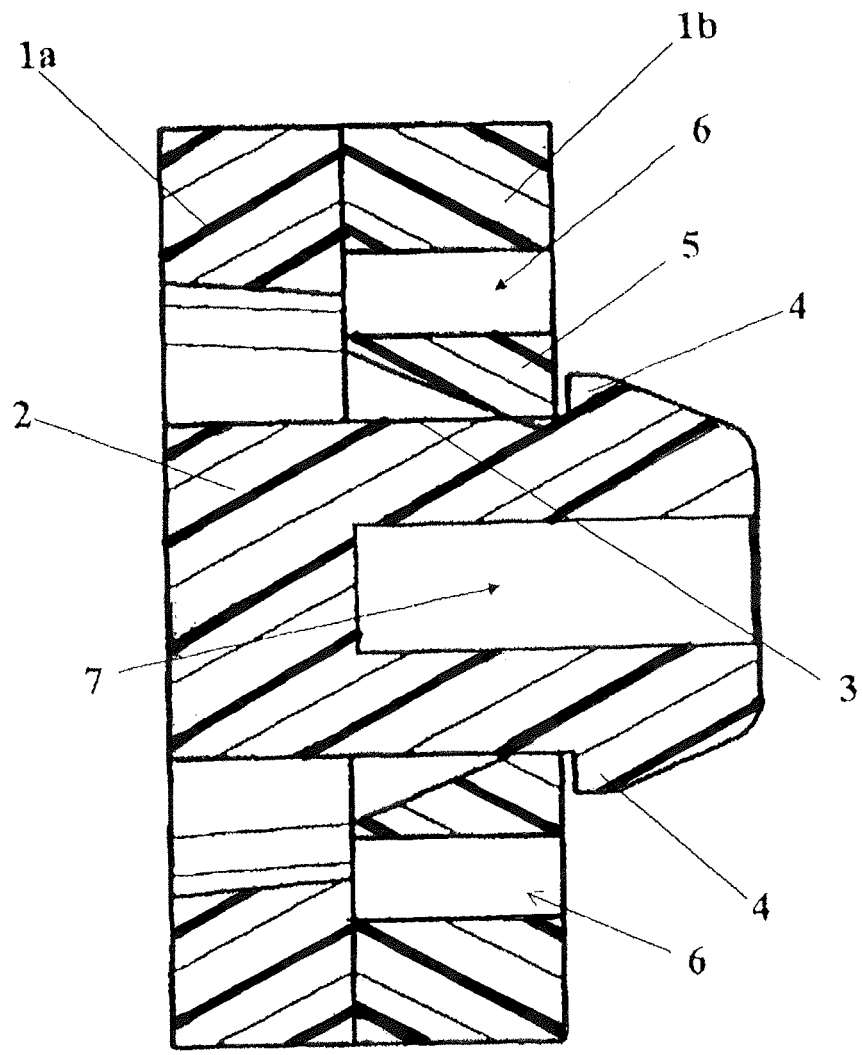
FIG. 3 shows an alternative specific embodiment of a peg locked in a recess, in section.

FIG. 3 shows an alternative embodiment of peg 2, a material recess 7 being formed here in peg 2, for example by an injection molding method during the manufacture of peg 2.

When this peg 2 is pushed through recess 3, the material of locking shoulders 4, which protrude past the shaft-shaped lower part of peg 2 (seen in the left part of the drawing), is pressed inward into material recess 7. After peg 2 has been completely pushed through recess 3, peg 2 again assumes its original shape. In this peg 2, ring gap segments 6 around recesses 3 need not be present.

In principle, however, both additional ring gap segments 6 and also material recesses 20 may be provided on an installation element 1.

Figure 7:
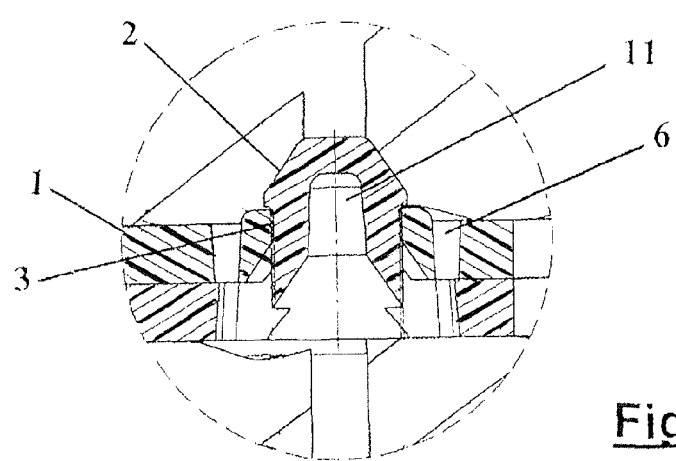
FIG. 7 shows a further alternative specific embodiment of a peg locked in a recess, in section.

FIG. 7 shows a further alternative embodiment of peg 2, a material recess 11 being formed here in peg 2, for example by an injection molding method during the manufacture of peg 2.

When this peg 2 is pushed through recess 3, the material of locking shoulders 4, which protrude past the shaft-shaped lower part of peg 2, is pressed inward into material recess 20. After peg 2 has been completely pushed through recess 3, peg 2 again assumes its original shape. In this peg 2, ring gap segments 6 around recesses 3 need not be present.

In principle, however, both additional ring gap segments 6 and also material recesses 20 may be provided on an installation element 1.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An installation element of an installed packing for the exchange of material and/or heat between gases and liquids, the installation element comprising a body having a defined thickness and having pegs projecting from the body and recesses provided in the body for locking with respective recesses and pegs of at least one further identical installation element, comprising:
    two ring gap segments allocated to each of the recesses, the ring gap segments extending through the entire thickness of the body of the installation element,
    two locking shoulders being fashioned on each peg to project radially outwardly from the peg, each locking shoulder having an angular extent of less than 90° such that a peripheral portion of an end of the peg between the locking shoulders has no projections extending radially beyond a surface of the peg, the pegs being positioned at a 180° distance from each other in the circumferential direction, each locking shoulder having at least one tapered face on an insertion side of the locking shoulder,
    the ring gap segments each having an angular extent greater than the angular extent of each locking shoulder, and
    the ring gap segments, and the two locking shoulders, are situated so as to correspond to one another in such a way that each time the peg is pushed through the recess, material in an edge area of the recess is displaced into the ring gap segments by means of the two locking shoulders, and when the peg has been completely pushed through the recess, the material in the edge area surrounding the recess returns to its initial position,
    wherein said material in the edge area of the recess that is displaceable into the ring gap segments by means of a locking shoulder comprises two tapered sections on the insertion side of the recess in positions to engage with the two tapered faces of the locking shoulders on the peg, the shape of said tapered section substantially corresponds to the shape of the tapered face of the locking shoulder, and the tapered section serves as a guide surface for said locking shoulder when the peg carrying said locking shoulder is inserted into said recess.

2. The installation element as recited in claim 1, wherein the ring gap segments are situated concentrically and symmetrically on a common circular line surrounding the recess.

3. The installation element as recited in claim 2, wherein in the installation element there are fashioned additional openings that form an aligned arrangement in the installed packing formed from a plurality of installation elements connected to one another.

4. The installation element as recited in claim 3, wherein the installation element is a grid mat or corrugated sheet manufactured in one piece from plastic as an injection-molded part.

5. The installation element as recited in claim 2, wherein the installation element is a grid mat or corrugated sheet manufactured in one piece from plastic as an injection-molded part.

6. The installation element as recited in claim 1, wherein in the installation element there are fashioned additional openings that form an aligned arrangement in the installed packing formed from a plurality of installation elements connected to one another.

7. The installation element as recited in claim 6, wherein the installation element is a grid mat or corrugated sheet manufactured in one piece from plastic as an injection-molded part.

8. The installation element as recited in claim 1, wherein the installation element is a grid mat or corrugated sheet manufactured in one piece from plastic as an injection-molded part.

9. A first and second installation element of an installed packing for the exchange of material and/or heat between gases and liquids, the installation elements each comprising a body having a defined thickness and one of the installation elements having a peg projecting from the body and the other of the installation elements having a recess extending through the entire thickness of the body such that the peg is received in the recess for locking the two installation elements together, comprising:
    two ring gap segments allocated to the recess, the ring gap segments extending through the entire thickness of the body of the installation element,
    two locking shoulders being fashioned on the peg to project radially outwardly from the peg, each locking shoulder having an angular extent of less than 90° such that a peripheral portion of an end of the peg between the locking shoulders has no projections extending radially beyond a surface of the peg, the pegs being positioned at a 180° distance from each other in the circumferential direction, each locking shoulder having at least one tapered face on an insertion side of the locking shoulder,
    the body having an opening therethrough directly axially in alignment with each locking shoulder, and
    the ring gap segments, and the two locking shoulders, being situated so as to correspond to one another in such a way that each time the peg is pushed through the recess, material in an edge area of the recess is displaced into the ring gap segments by means of the two locking shoulders, and when the peg has been completely pushed through the recess, the material in the edge area surrounding the recess returns to its initial position,
    wherein said material in the edge area of the recess that is displaceable into the ring gap segments by means of a locking shoulder comprises at least two tapered sections on the insertion side of the recess in positions to engage with the two locking shoulders on the peg, the shape of said tapered section substantially corresponds to the shape of the tapered face of the locking shoulder, and the tapered section serves as a guide surface for said locking shoulder when the peg carrying said locking shoulder is inserted into said recess.

10. The first and second installation element as recited in claim 9, wherein the ring gap segments are situated concentrically and symmetrically on a common circular line surrounding the recess.

11. The first and second installation element as recited in claim 9, wherein in the installation elements there are fashioned additional openings that form an aligned arrangement in the installed packing formed from a plurality of installation elements connected to one another.

12. The first and second installation element as recited in claim 9, wherein each installation element is a grid mat or corrugated sheet manufactured in one piece from plastic as an injection-molded part.

13. An installation element of an installed packing for the exchange of material and/or heat between gases and liquids, the installation element comprising a body having a defined thickness and having pegs projecting from the body and recesses provided in the body for locking with respective recesses and pegs of at least one further identical installation element, comprising:

two ring gap segments allocated to each of the recesses, the ring gap segments extending through the entire thickness of the body of the installation element, two locking shoulders being fashioned on each peg to project radially outwardly from the peg, each locking shoulder having an angular extent of less than 90° such that a peripheral portion of an end of the peg between the locking shoulders has no projections extending radially beyond a surface of the peg, the pegs being positioned at a 180° distance from each other in the circumferential direction, each locking shoulder having at least one tapered face on an insertion side of the locking shoulder, the ring gap segments each having an angular extent greater than the angular extent of each locking shoulder, the body having an opening therethrough directly axially in alignment with each locking shoulder, and the ring gap segments, and the two locking shoulders, are situated so as to correspond to one another in such a way that each time the peg is pushed through the recess, material in an edge area of the recess is displaced into the ring gap segments by means of the two locking shoulders, and when the peg has been completely pushed through the recess, the material in the edge area surrounding the recess returns to its initial position, wherein said material in the edge area of the recess that is displaceable into the ring gap segments by means of a locking shoulder comprises two tapered sections on the insertion side of the recess in positions to engage with the two tapered faces of the locking shoulders on the peg, the shape of said tapered section substantially corresponds to the shape of the tapered face of the locking shoulder, and the tapered section serves as a guide surface for said locking shoulder when the peg carrying said locking shoulder is inserted into said recess.

14. The installation element as recited in claim 13, wherein the ring gap segments are situated concentrically and symmetrically on a common circular line surrounding the recess.

15. The installation element as recited in claim 13, wherein in the installation element there are fashioned additional openings that form an aligned arrangement in the installed packing formed from a plurality of installation elements connected to one another.

16. The installation element as recited in claim 13, wherein in the installation element there are fashioned additional openings that form an aligned arrangement in the installed packing formed from a plurality of installation elements connected to one another.

17. The installation element as recited in claim 13, wherein the installation element is a grid mat or corrugated sheet manufactured in one piece from plastic as an injection-molded part.

* * * * *